UNITED STATES PATENT OFFICE.

WILLIAM P. CLOTWORTHY, OF BALTIMORE, MARYLAND.

PROCESS OF ROASTING COFFEE.

SPECIFICATION forming part of Letters Patent No. 245,996, dated August 23, 1881.

Application filed March 22, 1881. (No specimens.)

*To all whom it may concern:*

Be it known that I, WILLIAM PITT CLOTWORTHY, a citizen of the United States, residing at the city of Baltimore, in the State of Maryland, have invented certain new and useful Improvements in Roasting Coffee without appreciable loss of weight and preserving the aroma thereof; and I do hereby declare that the following is a full, clear, and exact description of the invention, which will enable others skilled in the art to which it appertains to make and use the same.

Heretofore coffee-beans have generally been roasted in pans, ovens, or cylinders, some single and simple in construction, others with separate chambers for roasting and drying, and more or less complicated, all aiming at the confessed desideratum of preserving the aroma and giving the roasted coffee good keeping qualities, for aiding in which different methods of coating and glazing roasted coffee have been invented and applied; but it is found, experimentally, that coffee loses a considerable percentage of its weight in the process of roasting, and that the foreign substances added to the roasted coffee-beans for the purpose of restoring the lost weight and preserving the qualities of the beans by coating them therewith only partially and temporarily accomplish their object, and that the coffee so prepared soon loses flavor, and often acquires an unpleasant flavor from the stale substances so applied. The existing methods of preparing coffee-beans for culinary purposes involve the two processes of roasting and glazing with albumen, gum-arabic, or other substance or preparation, which require more time than a single process would.

The object of my invention is to improve the quality of roasted coffee by preventing the escape of its aroma; to make it of uniform excellence by subjecting it to a uniform temperature; to obviate the loss of weight by immediately supplying the place of the water which evaporates from the beans in the process of roasting with oil; to save time, and thereby increase capacity and save fuel, and to complete the process in a single operation. I accomplish all of these objects by a very simple process, which consists of immersing the coffee-beans intended to be roasted in a pot or cauldron of cotton-seed oil heated to near the boiling-point, and allowing them to remain therein until properly browned or roasted.

To carry my invention into effect, I take a pot or cauldron of dimensions adapted to the size of the charge of coffee intended to be roasted therein, and I pour into it a sufficient quantity of oil to completely cover said charge. Many different oils, animal or vegetable, might be used; but I prefer cotton-seed oil, because of its purity as a table oil, its sweetness, and preservative properties. I heat said oil to near about the boiling-point. I then place the coffee-beans in a wire net or other convenient open-mesh receptacle, which will hold the coffee in place and allow the heated oil to come in contact therewith, and immerse it in the said heated oil, where I allow it to remain until it is completely browned, which usually requires only about five minutes, when it is withdrawn from its oil-bath, and after being allowed to dry is ready for grinding and making liquid coffee for the table.

The advantages of this process over any now in use are, first, that the operation is much speedier than any other, requiring only five minutes, whereas other processes require from forty minutes to an hour. The time required being but one-eighth of that ordinarily required, multiplies the value of the fuel used and the amount of coffee roasted by eight; secondly, that the coffee being entirely immersed in the oil during the process of roasting or browning, the oil prevents the aroma from escaping, and there is no necessity for trying to recover the lost aroma, as in the various processes now in vogue; thirdly, a more uniform temperature can be maintained in the heated oil than in metal cylinders or pans, and consequently there will be greater uniformity in results; fourthly, the water driven out of the green coffee-beans by the heat bubbles up through the oil, and is immediately replaced by the oil, which serves to preserve the original bulk and weight of the coffee-beans, and helps to preserve them and to hold the volatile aroma, so that greater strength is secured, and the coffee so prepared will keep for a long time without deterioration; fifthly, the whole process is accomplished in a single operation, and no necessity exists for the subsequent use of foreign preparations to coat over the roasted coffee.

Having fully described my invention, what I desire to claim, and secure by Letters Patent, is—

1. In the roasting of coffee-beans, the process of immersing the same in heated or boiling oils, especially cotton-seed oil, as above set forth and described.

2. The process of roasting coffee, which consists in browning the same in a hot-oil bath, substantially as described.

WILLIAM PITT CLOTWORTHY.

Witnesses:
LEWIS B. BROWNE,
LOUIS HORPEL.